United States Patent
Kaminsky et al.

(10) Patent No.: US 6,973,595 B2
(45) Date of Patent: Dec. 6, 2005

(54) DISTRIBUTED FAULT DETECTION FOR DATA STORAGE NETWORKS

(75) Inventors: David L. Kaminsky, Chapel Hill, NC (US); David M. Ogle, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 554 days.

(21) Appl. No.: 10/117,478

(22) Filed: Apr. 5, 2002

(65) Prior Publication Data

US 2003/0191992 A1  Oct. 9, 2003

(51) Int. Cl.[7] ............................................. G06F 11/00
(52) U.S. Cl. ...................................... 714/43; 709/224
(58) Field of Search .............................. 714/43, 44, 45, 714/48, 49, 56, 4, 47, 37; 709/220, 221, 249, 709/250, 223, 224

(56) References Cited

U.S. PATENT DOCUMENTS

| | | | |
|---|---|---|---|
| 3,873,819 A | 3/1975 | Greenwald ................... 235/153 |
| 5,390,326 A * | 2/1995 | Shah ........................... 370/222 |
| 5,537,653 A | 7/1996 | Bianchini, Jr. .......... 395/183.01 |
| 5,684,807 A | 11/1997 | Bianchini, Jr. et al. .... 371/20.1 |
| 5,712,968 A * | 1/1998 | Nakayama et al. ............. 714/4 |
| 5,724,341 A | 3/1998 | Inoue .......................... 370/221 |
| 5,774,640 A * | 6/1998 | Kurio ............................. 714/4 |
| 5,784,547 A * | 7/1998 | Dittmar et al. ................. 714/4 |
| 5,966,730 A | 10/1999 | Zulch .......................... 711/162 |
| 5,987,629 A * | 11/1999 | Sastry et al. ................... 714/48 |
| 6,278,690 B1 * | 8/2001 | Herrmann et al. ........... 370/224 |
| 6,282,112 B1 | 8/2001 | Couvee et al. ................. 365/52 |
| 6,308,282 B1 * | 10/2001 | Huang et al. ................... 714/4 |
| 2003/0031126 A1 * | 2/2003 | Mayweather et al. ........ 370/223 |

FOREIGN PATENT DOCUMENTS

| EP | 139069 A | 5/1985 | ........... G06F 11/22 |
|---|---|---|---|
| EP | 1115225 A2 | 7/2001 | ........... G04L 12/24 |
| JP | 9083516 A | 3/1997 | ........... H04L 12/26 |
| JP | 2000298597 A | 10/2000 | ........... G06F 11/22 |

OTHER PUBLICATIONS

TDB nl a 6-90 p395-396.

* cited by examiner

Primary Examiner—Nadeem Iqbal
(74) Attorney, Agent, or Firm—Walter W. Duft

(57) ABSTRACT

A distributed fault detection system and method for diagnosing a storage network fault in a data storage network having plural network access nodes connected to plural logical storage units. When a fault is detected, the node that detects it (designated the primary detecting node) issues a fault information broadcast advising one or more other access nodes (peer nodes) of the fault. The primary detecting node also sends a fault report pertaining to the fault to a fault diagnosis node. When the peer nodes receive the fault information broadcast, they attempt to recreate the fault. Each peer node that successfully recreates the fault (designated a secondary detecting node) sends its own fault report pertaining to said fault to the fault diagnosis node. The fault diagnosis node performs fault diagnosis based on all of the fault reports.

28 Claims, 6 Drawing Sheets

DISTRIBUTED FAULT DETECTION FOR DATA STORAGE NETWORKS

BACKGROUND OF THE INVENTION

1. Field of the Invention

The present invention relates to data storage networks, and especially switched networks implementing SAN (Storage Area Network) functionality, NAS (Network Attached Storage) functionality, or the like. More particularly, the invention concerns a distributed fault detection system and method for diagnosing storage network faults.

2. Description of the Prior Art

By way of background, data storage networks, such as SAN systems, provide an environment in which data storage peripherals are managed within a high speed network that is dedicated to data storage. Access to the storage network is provided through one or more access nodes that typically (but not necessarily) function as file or application servers (e.g., SAN application servers, NAS file server gateways, etc.) on a conventional LAN (Local Area Network) or WAN (Wide Area Network). Within the data storage network, the access nodes generally have access to all devices within the pool of peripheral storage, which may include any number of magnetic disk drive arrays, optical disk drive arrays, magnetic tape libraries, etc. In all but the smallest storage networks, the required connectivity is provided by way of arbitrated loop arrangements or switching fabrics, with the latter being more common.

FIG. 1 is illustrative. It shows a typical data storage network 2 in which a plurality of access nodes 4a–4e, all peers of each other, are connected via switches 6a–6b and controllers 8a–8c to plural LUNs 10a–10f, representing virtualized physical storage resources. Note that each access node 4a–4e has several pathways to each LUN 10a–10f, and that portions of each pathway are shared with other access nodes.

One of the problems with this kind of topology is that network faults due to controller failures, LUN failures, link failures and other problems are often difficult to isolate. Often, an access node will detect a problem, but will not know whether that problem is isolated to itself or has a larger scope. With this incomplete knowledge, it is difficult for the storage network to react optimally.

Each access node 4a–4e can only evaluate pathways between itself and the switches, controllers and LUNs to which it is connected. This permits the detection of limited information, which may or may not allow complete fault isolation. Examples of the kind of path information that can be determined by a single access node include the following:

1. A path from the node to a LUN is down;
2. All paths from the node to a LUN through a controller (path group) are down;
3. All paths from the node to a LUN through any controller are down;
4. All paths from the node to all LUNs through a controller are down; and
5. All paths from the node to all LUNs through all controllers are down.

Depending on which of the foregoing conditions is satisfied, a single access node can at least partially isolate the source of a storage network fault. However, to complete the diagnosis, the following information, requiring distributed fault detection, is needed:

1. Whether a path to a LUN from all nodes is down;
2. Whether all paths from all nodes to a LUN through a controller (path group) are down;
3. Whether all paths from all nodes to a LUN through any controller are down;
4. Whether all paths from all nodes to all LUNs through a controller are down; and
5. Whether all paths from all nodes to all LUNs through all controllers are down.

If such additional information can be determined, the following likely diagnoses can be made:

1. A switch's connection to a controller is likely defective;
2. A controller's connection to a LUN is likely defective;
3. A LUN is likely defective;
4. A controller is likely defective; and
5. A total system failure has occurred.

One solution to the problem of isolating faults in a data storage network is proposed in commonly assigned European Patent Application No. EP 1115225A2 (published Nov. 7, 2001). This application discloses a method and system for end-to-end problem determination and fault isolation for storage area networks in which a communications architecture manager (CAM) uses a SAN topology map and a SAN PD (Problem Determination) information table (SPDIT) to create a SAN diagnostic table (SDT). A failing component in a particular device may generate errors that cause devices along the same network connection path to generate errors. As the CAM receives error packets or error messages, the errors are stored in the SDT, and each error is analyzed by temporally and spatially comparing the error with other errors in the SDT. This allows the CAM to identify the faulty component.

It is to storage network fault analysis systems and methods of the foregoing type that the present invention is directed. In particular, the invention provides an alternative fault detection system and method in which access nodes act as distributed fault detection agents that assist in isolating storage network faults.

SUMMARY OF THE INVENTION

The foregoing problems are solved and an advance in the art is obtained by a distributed fault detection system and method for diagnosing a storage network fault in a data storage network having plural network access nodes connected to plural logical storage units. When a fault is detected, the node that detects it (designated the primary detecting node) issues a fault information broadcast advising the other access nodes (peer nodes) of the fault. The primary detecting node also sends a fault report pertaining to the fault to a fault diagnosis node. When the peer nodes receive the fault information broadcast, they attempt to recreate the fault. Each peer node that successfully recreates the fault (designated a secondary detecting node) sends its own fault report pertaining to the fault to the fault diagnosis node. Peer nodes that cannot recreate the fault may also report to the fault diagnosis node. The fault diagnosis node can then perform fault diagnosis based on reports from all of the nodes.

The secondary detecting nodes also preferably issue their own fault information broadcasts pertaining to the fault if they are able to recreate the fault. This redundancy, which can result in multiple broadcasts of the same fault information, helps ensure that all nodes will receive notification of the fault. In order to prevent multiple fault recreation attempts by the nodes as they receive the fault information broadcasts, the primary detecting node preferably assigns a unique identifier to the fault and includes the unique identifier in the initial fault information broadcast. By storing a record of the fault with the unique identifier, the peer nodes can test when they receive subsequent fault information broadcasts whether they have previously seen the fault. This will prevent repeated attempts to recreate the same fault event because a node will ignore the fault information broadcast if it has previously seen the fault event.

The fault reports sent to the fault diagnosis node preferably includes localized fault diagnosis information determined by the primary and secondary detecting nodes as a result of performing one or more diagnostic operations to ascertain fault information about a cause of the fault. The same localized fault information could also be provided between nodes as part of the fault information broadcasts. This sharing of information between nodes would be useful to each node as it performs its own localized diagnosis of the fault. The fault diagnosis performed by the fault diagnosis node may include determining one or more of a switch-controller connection being defective, a controller-storage device connection being defective, a storage device being defective, or a total system failure.

The invention further contemplates a computer program product that allows individual instances of the above-described fault detection functionality to execute on one or more access nodes of a data storage network.

BRIEF DESCRIPTION OF THE DRAWINGS

The foregoing and other features and advantages of the invention will be apparent from the following more particular description of preferred embodiments of the invention, as illustrated in the accompanying Drawings, in which.

DETAILED DESCRIPTION OF PREFERRED EMBODIMENTS

Figure 2:
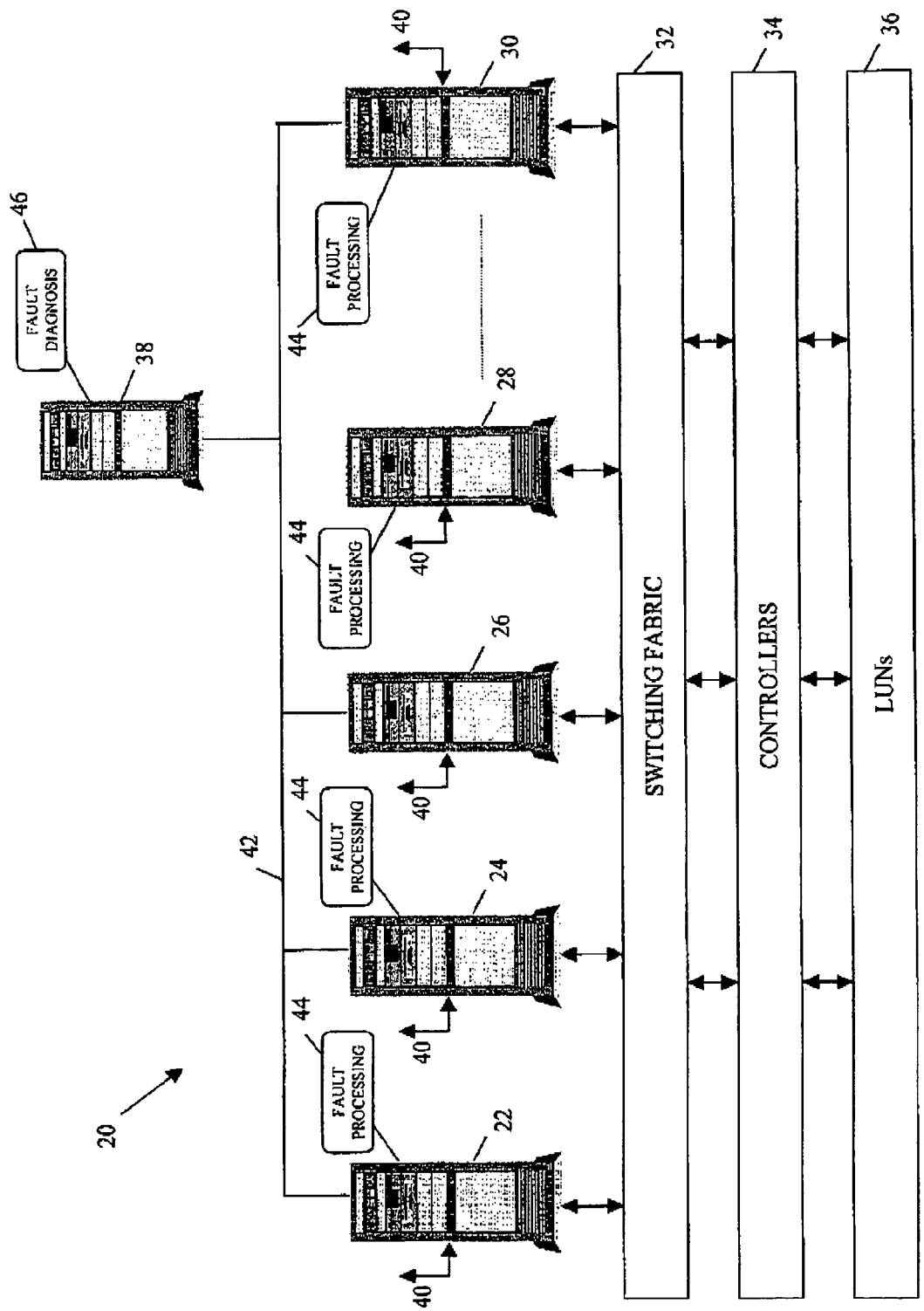
FIG. 2 is a functional block diagram showing a data storage network having access nodes and a fault diagnosis node constructed according to the principals of the invention.

Turning now to the figures, wherein like reference numerals represent like elements in all of the several views, FIG. 2 illustrates a data storage network 20 that is adapted to perform fault detection in accordance with the invention. The storage network 20 includes a plurality of access nodes, five of which are shown at 22, 24, 26, 28 and 30. The storage network 20 further includes a node that performs fault diagnosis functions. Although one of the access nodes 22–30 could be used for this purpose, a separate fault diagnosis node 38 is preferably provided. Each access node 22–30 of the storage network 20 is assumed to connect via a switching fabric 32 to a plurality of controllers 34. The controllers 34 are in turn connected to, and control the flow of data to and from, a plurality of LUNs 36.

Figure 1:
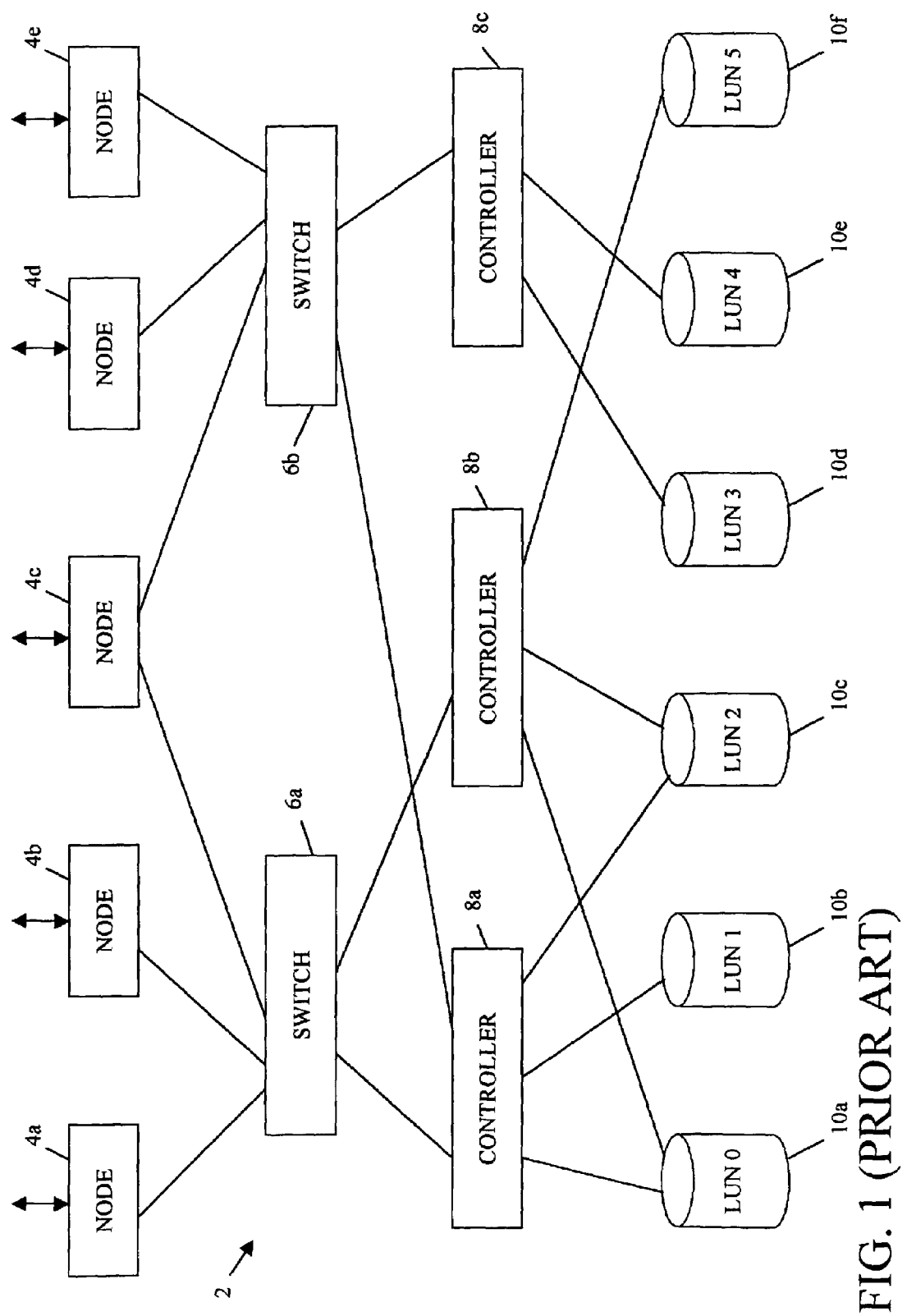
FIG. 1 is a functional block diagram showing a prior art data storage network.
Figure 3:
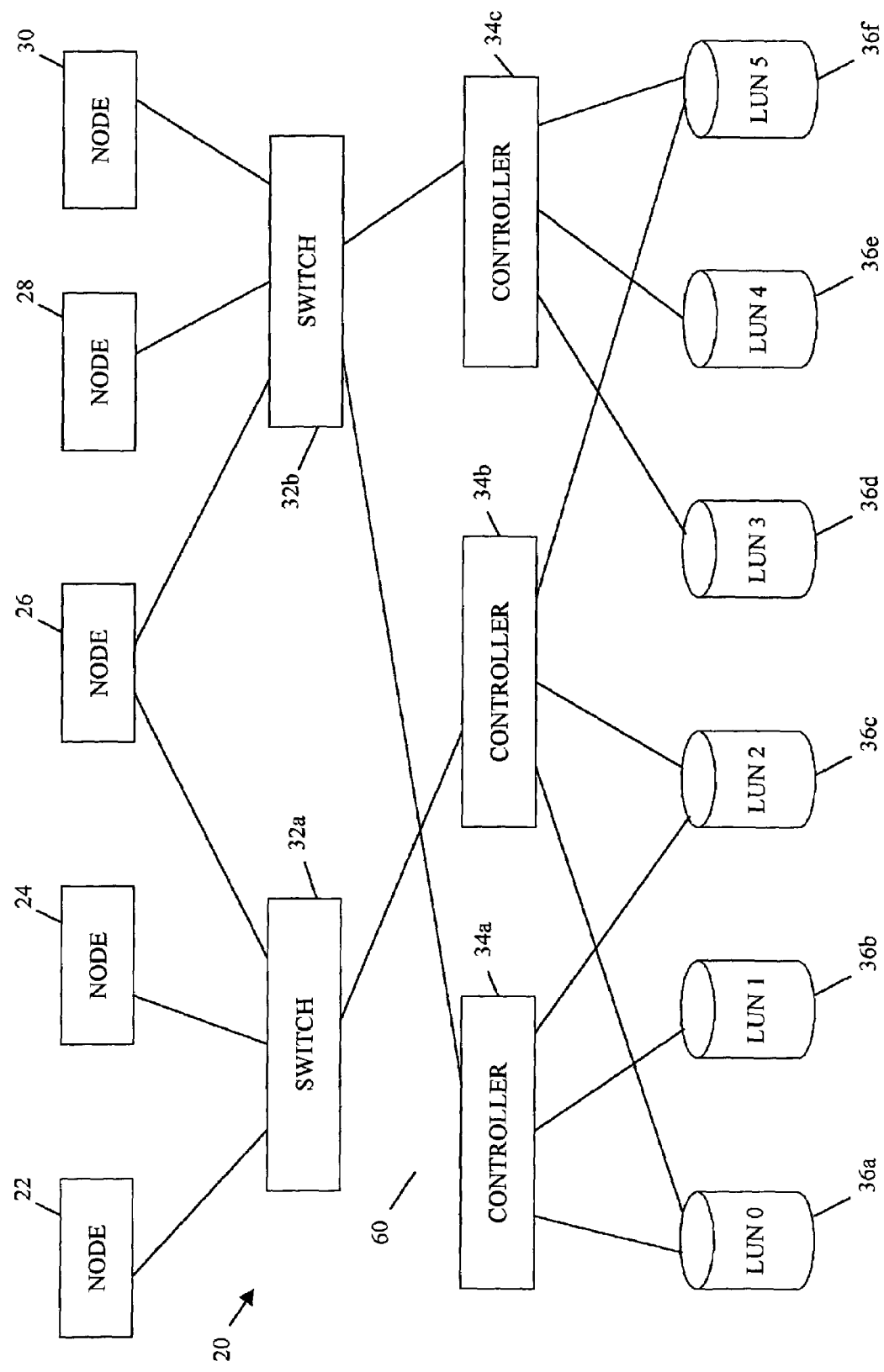
FIG. 3 is another functional block diagram of the data storage network of FIG. 2.

FIG. 3 illustrates an exemplary topology that can be used to configure the storage network 20 shown in FIG. 2. In this configuration, the switching fabric 32, the controllers 34 and the LUNs 36 are arranged to match the topology of FIG. 1 for convenience and ease of description. In the topology of FIG. 3, the switching fabric 32 includes a pair of switching elements 32a and 32b. The controllers 34 include three controllers 34a, 34b and 34c. The LUNs 36 include six LUNs 36a, 36b, 36c, 36d, 36e and 36f. Each of the access nodes 22–30 in FIG. 3 connects to one or both of the two switching elements 32a and 32b. Each switching element 32a and 32b connects to ax least two of the controllers 34a, 34b and 34c. Each controller 34a, 34b and 34c connects to two or more of the LUNs 36a–36f.

There are a variety of system components that can be used to implement the various elements that make up the storage network 20, depending on design preferences. Underlying the network design will be the selection of a suitable communication and media technology, such as Fibre Channel, Ethernet or SCSI. Selection of one of these core technologies will dictate the choice of devices that will be used to implement the switching elements 32a and 32b, as well as the network interfaces that reside in the access nodes 22–30 and the controllers 34a–34c. Selection of the controllers 34a–34c will be dictated by the physical storage devices that provide the LUNs 36a–36f. The latter could be implemented as RAID arrays, JBOD arrays, intelligent disk subsystems, tape libraries, etc., or any combination thereof. As persons skilled in the art will appreciate, each LUN represents a logical virtualization of some defined subset of the total pool of available physical storage space in the storage network 20. For example, a LUN could represent a set of disks in a RAID or JBOD array, or it could represent the entire array.

The access nodes 22–30 can be configured according to the data storage services they are intended to provide. Typically, they will function as file or application servers on a LAN or WAN. For example, one or more of the access nodes could be implemented as SAN application servers offering application services to client devices. Examples of such application servers include database servers, web servers, to name but a few. Other access nodes could be implemented as NAS file server gateways offering file I/O interfaces based on a network file system service such as NFS (Network File System), CIFS (Common Internet File System), or the like. Still other access nodes could be implemented as hosts that connect to both the data storage network 20 and a LAN or WAN, and which are programmed with client software such as the SANergy™ software product from International Business Machines Corporation ("IBM") and Tiviol Systems, mc. The SANergy™ product allows such hosts to handle NFS or CIFS file requests from other LAN hosts.

Regardless of the foregoing implementation choices, each access node 22–30 will preferably be built from a conventional programmable computer platform that is configured with the hardware and software resources needed to implement the required data storage network functions. Exemplary computer platforms include mainframe computers such as an IBM S/390 system running IBM's OS/390 operating system, mid-range computers such as an IBM AS/400 system running IBM's OS/400 operating system, workstation computers such as an IBM RISC/System 6000 system running IBM's Advanced Interactive Executive (AIX) operating system, or any number of microprocessor-based personal computers running a Unix-based operating system or operating system kernel, or a Unix-like operating system or operating system kernel, such as Linux, FreeBSD, etc.

Each access node 22–30 further includes an appropriate network interface, such as a Fibre Channel Host Bus Adapter (HBA), that allows it to communicate over the data storage network 20. An additional network interface, such as an Ethernet card, will typically be present in each access node 22–30 to allow data communication wit other hosts on a LAN or WAN. This data communication pathway is shown by the double-headed arrows 40 extending from each of the access nodes 22–30 in FIG. 2. It will also be seen in FIG. 2 that the access nodes 22–30 maintain communication with each other, and with the fault diagnosis node 38, over an inter-node communication pathway shown by the reference numeral 42. Any suitable signaling or messaging communication protocol, such as SNMIP (Simple Network Message Protocol), can be used to exchange information over the inter-node communication pathway 42. Various physical resources may be used to carry this information, including the LAN or WAN to which the access nodes are connected via the communication pathways 40, one or more pathways that are dedicated to inter-node communication, or otherwise.

Figure 4:
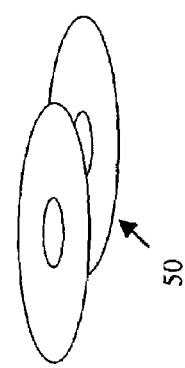
FIG. 4 is a diagrammatic illustration of a computer program product medium storing computer program information that facilitates distributed fault detection in accordance with the invention.

As additionally shown in FIG. 2, each access node 22–30 is programmed with fault processing software 44 that allows the access node to detect and process faults on network pathways to which the access node is connected. The fault diagnosis node 38 is programmed with fault diagnosis software 46 that allows it to perform distributed fault diagnosis by evaluating fault processing information developed by each access node's fault processing software 44. The functionality provided by the software 44 and 46 is described below. Note that one aspect of the present invention contemplates a computer program product in which the foregoing software is stored in object or source code form on a data storage medium, such as one or more portable (or non-portable) magnetic or optical disks. FIG. 4 illustrates an exemplary computer program product 50 in which the storage medium is an optical disk. The computer program product 50 can be used by storage network administrators to add distributed fault detection functionality in accordance with the invention to conventional data storage networks. In a typical scenario, one copy of the fault processing software 44 will be installed onto each of the access nodes 22–30, and one copy of the fault diagnosis software 46 will be installed onto the fault diagnosis 38. The software installation can be performed in a variety of ways, including local installation at each host machine, or over a network via a remote installation procedure from a suitable server host that maintains a copy of the computer program product 50 on a storage medium associated with the server host.

Persons skilled in the art will appreciate that data storage networks conventionally utilize management software that provides tools for managing the storage devices of the network. An example of such software is the Tivoli® Storage Network Manager product from IBM and Tivoli Systems, Inc. This software product includes agent software that is installed on the access nodes of a data storage network (such as the access nodes 22–30). The product further includes management software that is installed on a managing node of a data storage network (such as the fault diagnosis node 38) that communicates with the access nodes as well as other devices within and connected to the network switching fabric. Using a combination of inband and out-of-band SNMP communication, the management software performs functions such as discovering and managing data network topology, assigning/unassigning network storage resources to network access nodes, and monitoring and extending file systems on the access nodes. It will be appreciated that the fault processing software 44 and the fault diagnosis software 46 of the present invention could be incorporated into a product such as the Tivoli® Storage Network Manager as a functional addition thereto.

Figure 5A:
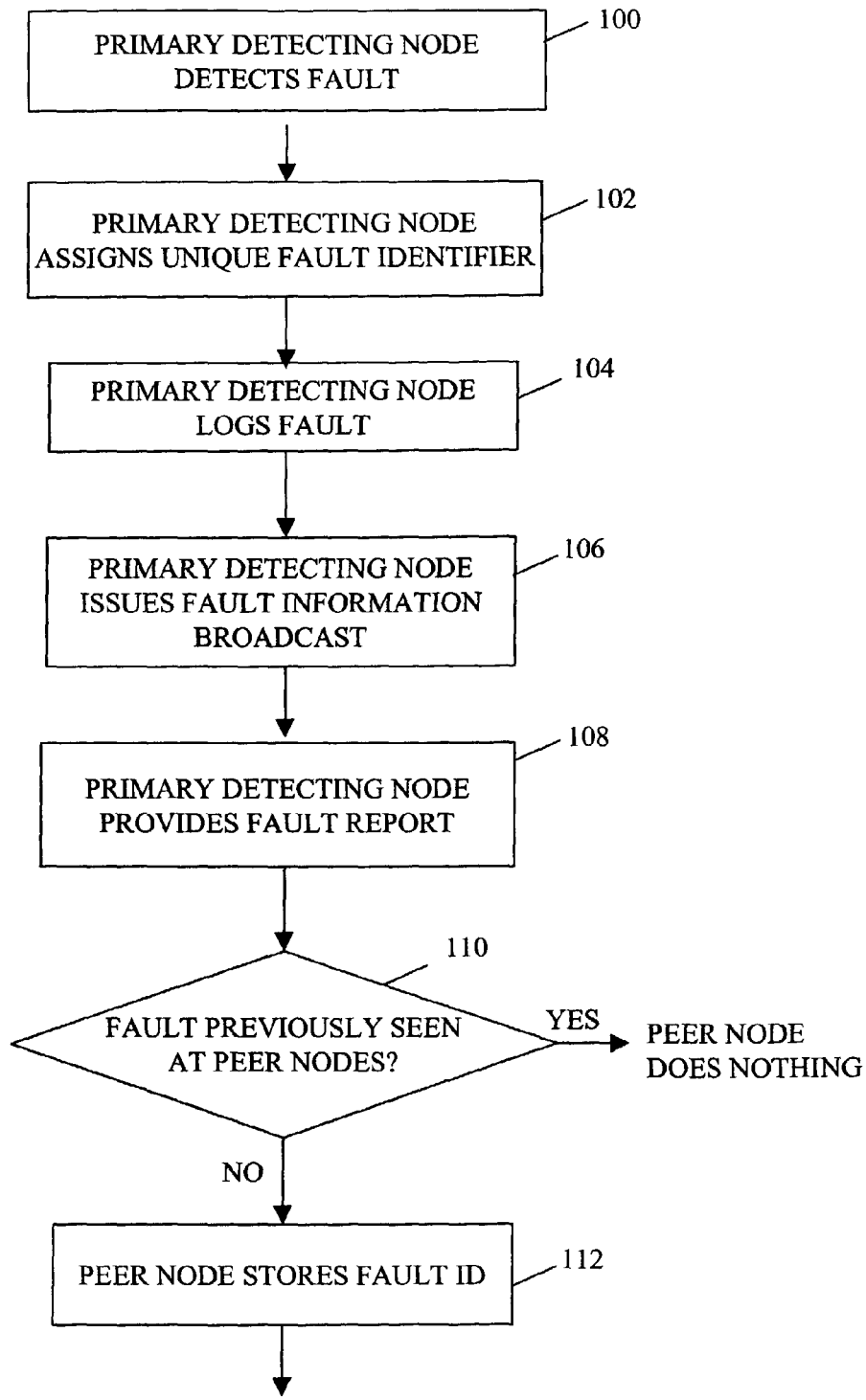
FIGS. 5A and 5B constitute a two-part flow diagram showing a fault detection method implemented in the data storage network of FIGS. 2 and 3.
Figure 5B:
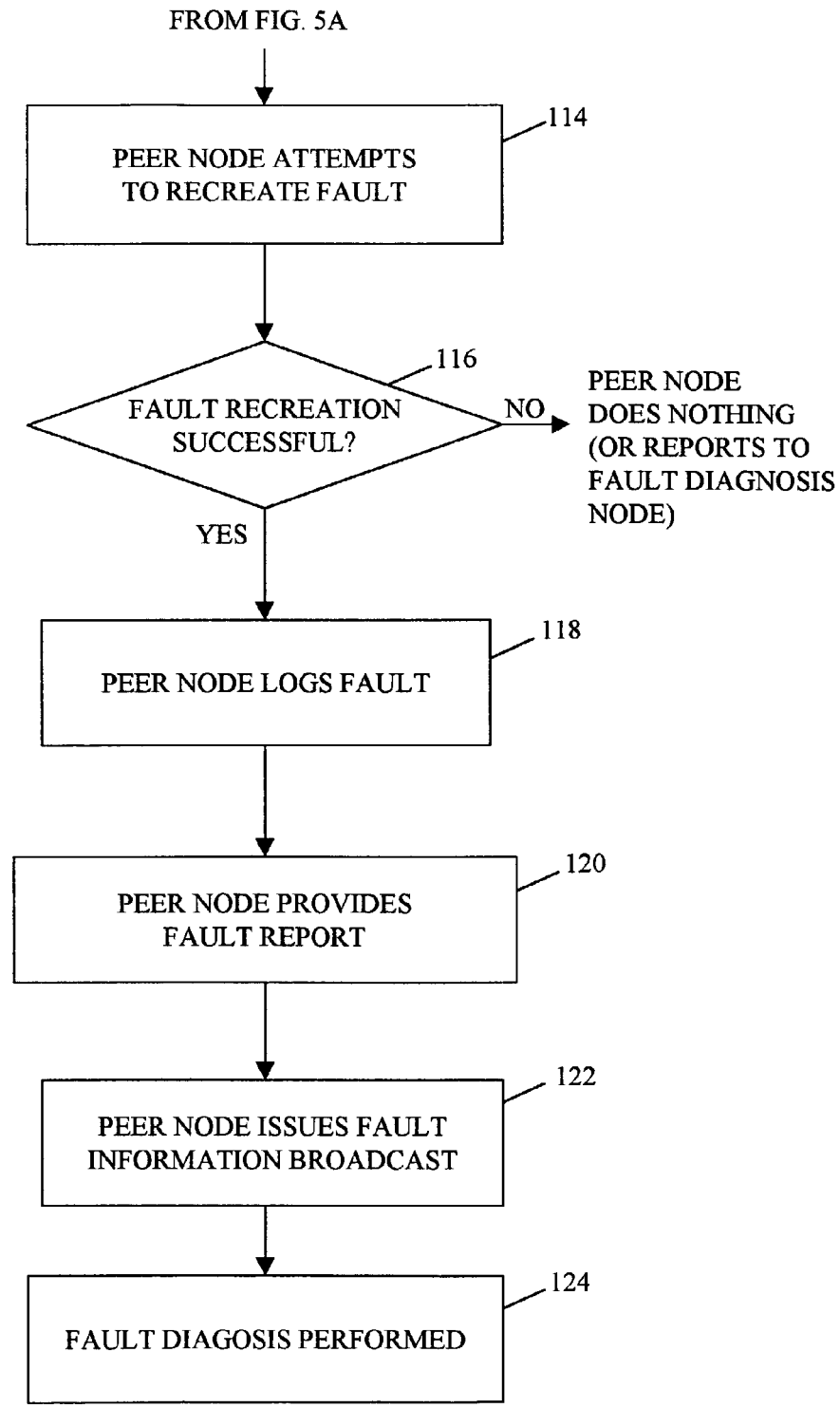

Turning now to FIGS. 5A and 5B, an exemplary distributed fault detection process according to the invention will now be described from a network-wide perspective. Thereafter, a description of the processing performed at an individual one of the access nodes 22–30 will be set forth with reference to FIG. 6, and a description of the processing performed at the fault diagnosis node 38 will be set forth with reference to FIG. 7.

In discussing the flow diagrams of FIGS. 5A and 5B, it will be assumed that the access node 22 cannot communicate with the LUN 36b (LUN 1), but can communicate with the LUN 36a (LUN 0) and the LUN 36c (LUN 2). Assume further that the cause of the problem is a defective link 60 between the switching element 32a and the controller 34a, as shown in FIG. 3. It will be seen that the node 22 cannot determine the source of the problem by itself For all it knows, the controller 34a could be defective, LUN 1 could be defective, or a connection problem could exist on any of the links between the switching element 32a and LUN 1. Note that the access node 22 does know that the path between itself and the switching element 32a is not causing the problem insofar as it is able to reach LUN 0 and LUN 2 through the controller 34b.

As a result of being unable to communicate with LUN 1, the access node 22 will detect this condition as a fault event in step 100 of FIG. 5A. The access node 22 will thereby become a primary fault detecting node. After the fault event is detected, the primary detecting node 22 assigns it a unique identifier, let us say P1 (meaning "Problem 1"), in step 102. The primary detecting node 22 then logs the fault P1 in step 104 by storing a record of the event in a suitable memory or storage resource, such as a memory space or a disk drive that is local to the primary detecting node. Remote logging, e.g., at the fault diagnosis node 38, would also be possible. In step 106, the primary detecting node 22 issues a fault information broadcast advising the other access nodes 24–30 (peer nodes) of the fault P1. The primary detecting node 22 also provides a fault report pertaining to the fault P1 to the fault diagnosis node 38. This is shown in step 108. Reporting a fault can be done in several ways. In one scenario, if the primary detecting node 22 logs the fault P1 remotely at the fault diagnosis node 38 in step 104, this would also serve to report the fault for purposes of step 108. Alternatively, if the primary detecting node 22 logs the fault P1 locally in step 104, then the reporting of fault P1 would constitute a separate action. Again, this action could be performed in several ways. In one scenario, the primary detecting node 22 could transfer a data block containing all of the fault information required by the fault diagnosis node 38. Alternatively, the primary detecting node 22 could send a message to the fault diagnosis node 38 to advise it of the fault, and provide a handle or tag that would allow the fault diagnosis node to obtain the fault information from the primary detecting node's fault log.

The quantum of fault information provided to the peer nodes in step 106, and to the fault diagnosis node in step 108, can also vary according to design preferences. For example, it may be helpful to provide the peer nodes 24–30 and/or the fault diagnostic node 38 with all diagnostic information the primary detecting node 22 is able to determine about the fault P1 by performing its own local diagnostic operations. In the fault example given above, this might include the primary detecting node 22 advising that it is unable to communicate with LUN 1, and further advising that it is able to communicate with LUN 0 and LUN 2 through the controller 34b. This additional information might help shorten overall fault diagnosis time by eliminating unnecessary fault detection steps at the peer nodes 24–30 and/or the fault diagnosis node 38.

When the peer nodes 24–30 receive the fault information broadcast from the primary detecting node 22 in step 106, they test the fault identifier in step 110 to determine whether they have previously seen the fault P1. If so, no further action is taken. If the peer nodes 24–30 have not seen the fault P1, they store the fault identifier P1 in step 112. All peer nodes that are seeing the fault P1 for the first time preferably attempt to recreate the fault in step 114. In step 116, a test is made to determine whether the recreation attempt was successful. For each peer node 24–30 where the fault P1 cannot be recreated, no further action needs to be taken. However, such nodes preferably report their lack of success in recreating the fault P1 to the fault diagnosis node 38. This ensures that the fault diagnosis will be based on data from all nodes. In the present example, the fault P1 would not be recreated at the peer nodes 26–30 because those nodes would all be able to communicate with LUN 1 through the switching element 32b and the controller 34a (see FIG. 3). On the other hand, the peer node 24 would be able to recreate the fault P1 because it can only communicate with LUN 1 via the link 60, which is defective. Having successfully recreated the fault P1, the peer node 24 would become a secondary detecting node. The test in step 116 would produce a positive result. In step 118, the secondary detecting node 24 logs the fault P1 using the same unique identifier. It then provides its own fault report pertaining to the fault P1 to the fault diagnosis node 38 in step 120. In step 122, the secondary detecting node 24 preferably issues its own fault information broadcast pertaining to the fault P1. This redundancy, which can result in multiple broadcasts of the same fault information, helps ensure that all nodes will receive notification of the fault P1.

In step 124, the fault diagnosis node 38 performs fault diagnosis based on the distributed fault detection information received from the access nodes as part of the fault reports. The fault diagnosis may include determining one or more of a switch-controller connection being defective, a controller-storage device connection being defective, a storage device being defective, a total system failure, or otherwise. In the current example, the fault diagnosis node 38 receives fault reports from access nodes 22 and 24 advising that they cannot reach LUN 1. The fault diagnosis node 38 will also preferably receive reports from the access nodes 26, 28 and 30 advising that they were unable to recreate the fault P1. If the fault diagnosis node 38 receives no fault reports from the access nodes 26, 28 and 30, it will assume that these nodes could not recreate the fault P1. Because the fault diagnosis node 38 is preferably aware of the topology of the data storage network 20, it can determine that the controller 34a, LUN 1 and the link extending between the controller 34a and LUN 1 are all functional. It can further determine that the switching element 32a is functional, and that the link between the node 22 and the switching element 32a is functional. This leaves the link 60 as the sole remaining cause of the fault P1.

Figure 6:
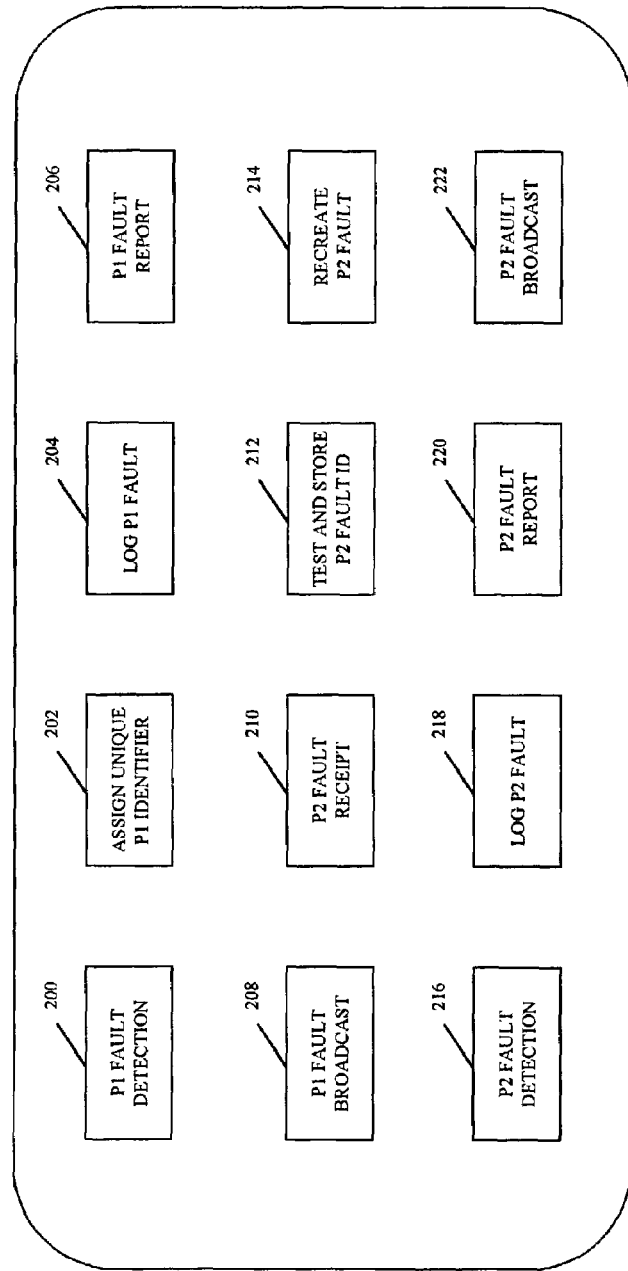
FIG. 6 is a block diagram showing functional elements of fault processing software for controlling an access node of the data storage network of FIGS. 2 and 3.

Turning now to FIG. 6, the various software functions provided by each copy of the fault processing software 44 that is resident on the access nodes 22–30 are shown in block diagrammatic form. For reference purposes in the following discussion, the access node whose fault processing software functions are being described shall be referred to as the, programmed access node. The fault processing software 44 includes a functional block 200 tat is responsible for the programmed access node detecting a fault P1 when the programmed access node acts as a prunary detecting node. A functional block 202 of the fault processing software 44 is responsible for assigning the fault P1 its unique identifier. A functional block 204 of the fault processing software 44 is responsible for logging the fault P1 using the unique identifier. A functional block 206 of the fault processing software 44 is responsible for providing a fault report pertaining to the fault P1 to the fault diagnosis node 38. A functional block 208 of the fault processing software 44 is responsible for broadcasting fault information pertaining to the fault P1 (fault information broadcast) to other access nodes that are peers of the programmed access node when it acts as a primary detecting node.

A functional block 210 of the fault processing software 44 is responsible for receiving a fault information broadcast pertaining to a fault P2 detected at another access node when the programmed access node acts as a secondary detecting node. A functional block 212 of the fault processing software 44 is responsible for responding to receipt of the second fault information by testing whether the programmed access node has previously seen the fault P2, and if not, for storing the unique identifier of the fault P2. A functional block 214 of the fault processing software 44 is responsible for attempting to recreate the fault P2. A functional block 216 of the fault processing software 44 is responsible for detecting the fault P2 as a result of attempting to recreate it. A functional block 218 of the fault processing software 44 is responsible for logging the fault P2. A functional block 220 of the fault processing software 44 is responsible for providing a fault report pertaining to the fault P2 to the fault diagnosis node 38. A functional block 222 of the fault processing software 44 is responsible for broadcasting fault information pertaining to the fault P2 (fault information broadcast) to other access nodes that are peers of the programmed access node when it acts as a secondary detecting node.

Figure 7:
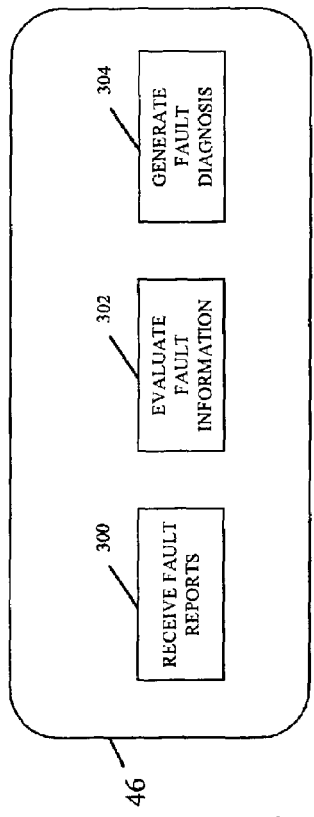
FIG. 7 is a block diagram showing functional elements of fault diagnosis software for controlling a fault diagnosis node of the data storage network of FIGS. 2 and 3.

Turning now to FIG. 7, the various software functions provided by the fault diagnosis software 46 that is resident on the fault diagnosis node 38 are shown in block diagrammatic form. The fault diagnosis software 46 includes a functional block 300 that is responsible for receiving fault reports from the access nodes 22–30 concerning a storage network fault. A functional block 302 of the fault diagnosis software 46 is responsible for evaluating fault information contained in the fault reports. A functional block 304 of the fault diagnosis software 46 is responsible for generating a distributed diagnosis of the storage network fault based on the fault information evaluation. As mentioned above, the fault diagnosis performed by the fault diagnosis node 38 may include determining one or more of a switch-controller connection being defective, a controller-storage device connection being defective, a storage device being defective, a total system failure, or otherwise.

Accordingly, a distributed fault detection system and method for a data storage network has been disclosed, together with a computer program product for implementing distributed fault detection functionality. While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. In a data storage network having plural network access nodes connected to plural logical storage units, a distributed fault detection method for diagnosing a storage network fault, comprising:
   broadcasting fault information pertaining to a fault (fault information broadcast) from one of said access nodes that detects said fault (primary detecting node) to at least one other of said access nodes that are peers of said primary detecting node (peer nodes);
   said fault representing said primary detecting node being unable to communicate with a logical storage unit;
   attempting to recreate said fault at said peer nodes by said peer nodes attempting to communicate with the logical storage unit associated with said fault;
   providing fault reports pertaining to said fault to a fault diagnosis node from said primary detecting node and any of said peer nodes that are able to recreate said fault (secondary detecting nodes); and
   said fault diagnosis node performing fault diagnosis based on said fault reports.

2. A method in accordance with claim 1 wherein said primary detecting node assigns a unique identifier to said fault and includes said unique identifier in said fault information broadcast.

3. A method in accordance with claim 1 wherein said primary and secondary detecting nodes log said fault if they are able to detect or recreate said fault.

4. A method in accordance with claim 1 wherein said peer nodes ignore said fault information broadcast if they have already been advised of said fault.

5. A method in accordance with claim 1 wherein said peer nodes take no action regarding said fault if they cannot recreate said fault.

6. A method in accordance with claim 1 wherein said peer nodes report to said fault diagnosis node if they cannot recreate said fault.

7. A method in accordance wit claim 1 wherein said peer nodes broadcast said fault information pertaining to said fault if they successfully recreate said fault.

8. A method in accordance with claim 1 wherein said fault reports provided to said fault diagnosis node include localized fault diagnosis information determined by said primary and secondary detecting nodes as a result of performing one or more diagnostic operations to ascertain fault information about a cause of said fault.

9. A method in accordance with claim 1 wherein said fault information provided by said primary detecting node to said peer nodes includes information determined from one or more diagnostic operations performed by said primary detecting node to ascertain fault information about a cause of said fault.

10. A method in accordance with claim 1 wherein said fault diagnosis performed by said fault diagnosis node includes determining one or more of a switch-controller connection being defective, a controller-storage device connection being defective, a storage device being defective, or a total system failure.

11. In a system adapted for use as a network access node of a data storage network having plural network access nodes connected to plural logical storage units, a fault detection system enabling said access node to participate in distributed diagnosis of a storage network fault, comprising:
   means for detecting a fault P1 when said access node acts as a primary detecting node;
   said fault P1 representing said access node being unable to communicate with a logical storage unit;
   means for broadcasting fault information pertaining to said fault P1 (first fault information broadcast) to one or more other access nodes that are peers of said access node;
   means for receiving a second fault information broadcast pertaining to a fault P2 detected at one of said other access nodes when said access node acts as a secondary detecting node;
   said fault P2 representing said one other access node being unable to communicate with a logical storage unit;
   means responsive to receiving said second fault information broadcast for attempting to recreate said fault P2 by attempting to communicate with the logical storage unit associated with said fault P2; and
   means for providing fault reports pertaining to said faults P1 and P2 to a fault diagnosis node.

12. A system in accordance with claim 11 further including means for assigning a unique identifier to said fault P1 and including said unique identifier in said first fault information broadcast.

13. A system in accordance with claim 11 further including means for logging said fault P1 if said access node detects said fault P1 and for logging said fault P2 if said access node recreates said fault P2.

14. A system in accordance with claim 11 further including means for testing whether said access node has received notification of said fault P2 and for taking no action in response to said second fault information broadcast if said access node has already been advised of said fault P2.

15. A system in accordance with claim 11 further including means for taking no action upon failure of said access node to recreate said fault P2.

16. A system in accordance with claim 11 further including means for reporting to said fault diagnosis node upon failure of said access node to recreate said fault P2.

17. A system in accordance with claim 11 further including means for broadcasting fault information pertaining to said fault P2 upon successful recreation of said fault P2.

18. A system in accordance with claim 11 wherein said fault information pertaining to said fault P1 includes information determined from one or more diagnostic operations performed by said access node to ascertain fault information about a cause of said fault P1.

19. A system in accordance with claim 11 wherein said fault reports provided to said fault diagnosis node include localized fault diagnosis information determined by said access node acting as a primary or secondary detecting node as a result of performing one or more diagnostic operations to ascertain fault information about a cause of said fault P1 or P2.

20. A computer program product for use in a data storage network having plural network access nodes communicating with plural data storage logical units, comprising:
   one or more data storage media;
   means recorded on said data storage media for controlling one of said access nodes to detect a fault P1 when said access node acts as a primary detecting node;
   said fault P1 representing said access node being unable to communicate with a logical storage unit;

means recorded on said data storage media for controlling one of said access nodes to broadcast fault information pertaining to said fault P1 (first fault information broadcast) to at least one other of said access nodes that are peers of said access node;

means recorded on said data storage media for controlling one of said access nodes to receive a second fault information broadcast pertaining to a fault P2 detected at another of said access nodes when said access node acts as a secondary detecting node;

said fault P2 representing said one other access node being unable to communicate with a logical storage unit;

means recorded on said data storage media for controlling one of said access nodes to respond to receipt of said second fault information broadcast by attempting to recreate said fault P2 by attempting to communicate with the logical storage unit associated with said fault P2; and means recorded on said data storage media for controlling one of said access nodes to send fault reports pertaining to said faults P1 and P2 to a fault diagnosis node.

21. A computer program product in accordance with claim 20 further including means recorded on said data storage media for controlling one of said access nodes to assign a unique identifier to said fault P1 and include said unique identifier in said first fault information broadcast.

22. A computer program product in accordance with claim 20 further including means recorded on said data storage media for logging said fault P1 if said access node detects said fault P1 and for logging said fault P2 if said access node recreates said fault P2.

23. A computer program product in accordance with claim 20 further including means recorded on said data storage media for testing whether said access node has received notification of said fault P2 and for taking no action in response to said second fault information broadcast if said access node has already been advised of said fault P2.

24. A computer program product in accordance with claim 20 further including means recorded on said data storage media for taking no action upon failure of said access node to recreate said fault P2.

25. A computer program product in accordance with claim 20 further including means recorded on said data storage media for controlling one of said access nodes to report to said fault diagnosis node upon failure of said access node to recreate said fault P2.

26. A computer program product in accordance with claim 20 further including means recorded on said data storage media for controlling one of said access nodes to broadcast fault information pertaining to said fault P2 upon successful recreation of said fault P2.

27. A computer program product in accordance with claim 20 wherein said fault information pertaining to said fault P1 includes information determined from one or more diagnostic operations performed by said access node to ascertain fault information about a cause of said fault P1.

28. A computer program product in accordance with claim 20 wherein said fault reports provided to said fault diagnosis node include localized fault diagnosis information determined by said access node acting as a primary or secondary detecting node as a result of performing one or more diagnostic operations to ascertain fault information about a cause of said fault P1 or P2.

* * * * *